United States Patent Office
3,201,781
Patented Aug. 17, 1965

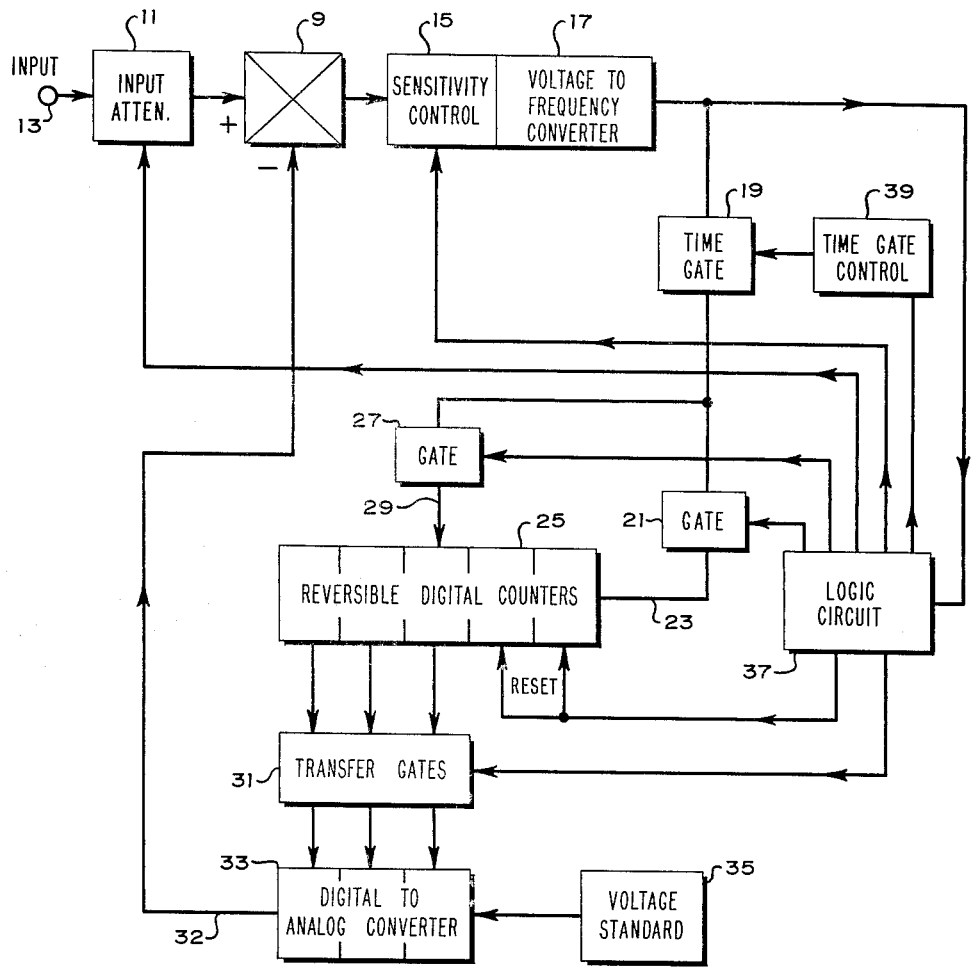

3,201,781
ANALOG TO DIGITAL TRANSDUCERS
Edward R. Holland, Palo Alto, Calif., assignor to Hewlett-Packard Company, Palo Alto, Calif., a corporation of California
Filed July 23, 1962, Ser. No. 211,771
9 Claims. (Cl. 340—347)

This invention relates to the method and means for producing a digital indication of an applied signal.

Electronic instruments which have digital readouts generally use pulse-counting techniques to obtain the digits that are to be displayed for a given applied signal. Specifically, pulses having a fixed repetition rate may be counted for a variable period or pulses having a variable repetition rate may be counted for a fixed period. Thus, either the repetition rate of pulses or the counting period may be varied in accordance with the applied signal. Electronic voltmeters having digital readouts are typical of devices which use either of these pulse counting techniques. The use of one of these schemes in a digital voltmeter is suggested in U.S. Patent 2,994,825 issued to T. C. Anderson on August 1, 1961.

One disadvantage inherent in each of these pulse-counting techniques is that the accuracy of the digital indication is limited by the linearity of the relationship that is provided between pulse repetition or counting period and the amplitude of the applied signal. In applications requiring highly accurate indications of applied signals, it is desirable to provide a system in which the relationship between repetition rate or counting period and the applied signal is made linear over a wide range of applied signal amplitudes.

Accordingly, it is an object of the present invention to provide a device which accurately converts an analog signal to a digital indication.

It is another object of the present invention to provide an improved analog-to-digital transducer.

It is still another object of the present invention to provide a digital voltmeter in which the accuracy of the digital readout for a given applied signal approaches the accuracy of passive elements used in the circuit.

In accordance with a preferred embodiment of the present invention pulses are produced which have a repetition frequency related to the amplitude of an error signal. The pulses are gated into a counter for a predetermined counting period. A feedback signal is produced which has an amplitude related to the count of pulses taken during the counting period, which feedback signal is compared with the applied signal to produce said error signal.

Other and incidental objects of the present invention will be apparent from a reading of this specification and an inspection of the accompanying drawing which shows a block diagram of the circuit of the present invention.

Referring to the drawing, there is shown a summing network 9 having one input terminal connected through input attenuator 11 to the input terminal 13. The output of summing network 9 is connected through sensitivity control 15 to the voltage-to-frequency converter 17 which may be of the type shown and described, for example, in U.S. Patent 3,040,273 issued on June 19, 1962, to B. F. Boff. The output of the voltage-to-frequency converter 17 is connected through the time gate 19 and gate 21 to the input 23 of the reversible-digital counter 25 and is connected through time gate 19 and gate 27 to input 29 of the counter 25. The reversible-digital counter 25 may be of the type shown and described, for example, in U.S. Patent 2,819,394 issued on January 7, 1958, to B. M. Gordon. Output signals from the three most-significant digits of counter 25 are applied through transfer gates 31 to the digital-to-analog converter 33 which may be of the type shown and described, for example, in U.S. Patent 2,718,634 issued on September 20, 1955, to S. Hansen, or in Notes on Analog-Digital Conversion Techniques; Alfred K. Suskind; Technology Press; Massachusetts Institute of Technology; 1957; pages 5–36, figures 5–21. One input of the digital-to-analog converter is connected to voltage standard 35 and the output of the converter is connected to the other input of summing network 9. Logic circuit 37 receives the output of the voltage-to-frequency converter 17 and is connected through time gate control 39 to operate the time gate 19. Logic circuit 37 is also connected to operate gates 21 and 27 and transfer gates 31 and is connected to control the input attenuator 11 and to provide reset pulses for the counter 25.

The present circuit operates in two modes. In the first mode when the error signal from the summing network 9 is very large, the sensitivity of the voltage-to-frequency converter 17 is reduced by sensitivity control 15. The signal frequency thus produced is applied through time gate 19 and gate 27 to the third place digit counter of the reversible-digital counter 25 at input terminal 29. In the second mode when the error signal at the output of summing network 9 is small, the voltage-to-frequency converter 17 operates at maximum sesitivity. The signal frequency thus produced is applied through time gate 19 and gate 21 to the first-place digit counter of the reversible-digital counter 25 at input 23.

When signal is first applied at input terminal 13, no signal is available from the digital-to-analog converter 33 for comparison in network 9 with the input signal. The error signal is thus very large and the circuit operates in the first mode previously described. Time gate 19 and gate 27 are enabled for a predetermined time by logic circuit 37. A count is taken of the signal frequency applied at input terminal 29 by the three most-significant digit counters of the reversible-digital counter 25. After the predetermined time lapses and the gates 19 and 27 are closed, transfer gates 31 are enabled and the count is transferred to the digital-to-analog converter 33. The digital-to-analog converter 33 receives the voltage from voltage standard 35 and produces a steady voltage at terminal 32 related to the count information received.

This steady voltage is applied to the other input of the summing network 9 for comparison with the signal appearing at the output of attenuator 11. Automatic ranging may be provided by connecting logic circuit 37 to control the attenuation provided by input attenuator 11 and to control the location of the radix point in counter 25.

Following the operation of the circuit in the first mode, the count information provided by counter 25 is stored in the digital-to-analog converter 33. The steady voltage at output terminal 32 resulting therefrom may in practice be well within two-tenths percent of the value of the applied voltage. The error signal at the output of summing network 9 thus becomes very small and the circuit then operates in the second mode previously described. The sensitivity of the voltage-to-frequency converter 17 is then increased to maximum, say by a factor of 100 to 1 for a digital counter 25 which operates according to the decimal number system. Logic circuit 37 enables time gate 19 through time gate control 39 and enables gate 21 for a predetermined time. The signal frequency at the output of voltage-to-frequency converter 17 is then applied through time gate 19 and gate 21 to the input 23 of the reversible-digital counter 25. A five-place digital indication of the signal frequency at input 23 produced by the voltage-to-frequency converter 17 operating with maximum sensitivity on a small error signal is thus provided by the reversible-digital counter 25 at the end of the second mode of operation. The three most-significant digit places may be altered positively or negatively by a count or two in response to the carry-over from the count in the two least-significant digits. The desired digital output is now available from the reversible-digital counter 25 and the transfer gates 31 are enabled, making the number stored in the digital-to-analog converter 33 equal to the three most-significant digits of the number in the counter.

At the completion of the measurement cycle, the last two digits of the reversible counter are reset to zero by the reset signal produced by logic circuit 37. If there are no large changes in the voltage appearing at input terminal 13, no large change appears in the error signal at the output of network 9 and hence the voltage-to-frequency converter 17 continues to operate with maximum sensitivity. Time gate 19 and gate 21 are again enabled by logic circuit 37 and a count is taken by the reversible-digital counter 25 of the signal frequency appearing at input 23. The portions of the measurement cycle which includes resetting the last two places of the counter 25 and recounting the signal frequency at input 23 applied through time gate 19 and gate 21 is repeated continuously to provide a continuous check on the signal at input terminal 13. To avoid confusion, readout storage circuits are provided in each place of the digital counter 25. These circuits maintain a continuous display while the counter is free to operate on a new count cycle, the stored readout changing only when the count taken starting from zero is different from a previous count. Circuits of this type are described in pending U.S. Patent application Serial No. 133,125, now Pat. No. 3,165,633, filed August 22, 1961 by I. Wunderman and B. Harrison.

If the input voltage is changed by a value greater than 1 percent of full scale, such that the error signal at the output of network 9 is larger than can be registered by a change in the count taken by the last two digits of counter 25, then the circuit returns to the first mode of operation and the entire count cycle is repeated.

The circuit of the present invention thus provides an accurate digital indication of an applied signal in a single step. The maximum accuracy may be achieved in one additional counting step. This avoids the conventional necessity of making successive digital approximations to arrive at the desired indication within predetermined limits of accuracy. In addition, the present circuit provides a continuous check on the applied signal without going through the entire operating cycle for small variations in the amplitude of the applied signal.

I claim:

1. Apparatus for producing a digital indication of an applied analog signal comprising means forming pulses having selected repetition rate, digital counting means producing a digital output related to the number of pulses applied thereto in a selected interval of time, means connected to said digital counting means for producing an analog signal related to said digital output, means connected to receive said analog signal and the applied analog signal for producing an error signal related to the combination of the two last-named analog signals, and means connected to receive said error signal for altering one of said repetition rate and said interval of time.

2. Apparatus for producing a digital indication of an applied analog signal comprising means forming pulses having a selected repetition rate, digital counting means connected to count said pulses during an interval of time for producing a digital output related to said count, means connected to said digital counting means for producing an analog signal related to said digital output, a comparator connected to receive said last-named analog signal and the applied analog signal for producing an error signal related to the combination of the two last-named analog signals, and means connected to receive said error signal for varying said interval of time in response to the amplitude of said error signal.

3. Apparatus for producing a digital indication of an applied analog signal comprising means forming pulses having a variable repetition rate, digital counting means connected to count said pulses for a selected period for producing a digital output related to said count, means connected to said digital counting means for producing an analog signal having an amplitude related to said digital output, means connected to receive said analog signal and said applied analog signal for producing an error signal as the difference between the two last-named analog signals, and means connected to receive said error signal for altering the repetition rate of said pulses in response to the amplitude of said error signal.

4. Apparatus for producing a digital indication of an applied analog signal comprising means forming pulses during a first operating period having a selected repetition rate, counting means connected to count said pulses of selected repetition rate for a predetermined time interval during the first operating period to produce a digital output related to said count, means connected to said counting means for producing an analog signal after said first period having an amplitude related to said digital output, means connected to receive said analog signal and said applied analog signal for producing an error signal related to the combination of the two last-named analog signals, means connected to receive said error signal for altering one of said selected repetition rate and predetermined time interval in response to the amplitude of said error signal for operation during a second period, said counting means counting the pulses appearing during the second operating period in response to one of said repetition rate and predetermined time interval being altered after the first operating period, said counting means being adapted to alter the count taken of pulses during the first operating period in response to the count taken of pulses during the second operating period.

5. Apparatus for producing a digital indication of an input signal, said apparatus comprising pulse-forming means for producing pulses having a selected repetition rate, a gate, control means for enabling said gate for a selected conduction period, a counter for producing a digital output related to the count taken of pulses applied thereto, a network having an output and a pair of inputs, said network producing an error signal at the output thereof as the difference between signals applied to the inputs thereof, one of said inputs being connected to receive the input signal, means connected to receive said error signal for varying one of the selected repetition rate and selected conduction period, means to apply to one input of said network after the selected conduction period a signal having an amplitude related to said digital output produced by the counter during said selected conduction period, and means to alter one of the repetition rate of said pulses and conduction period of said gate after said selected conduction period to increase the number of pulses applied to said counter after said selected conduction period and during a subsequent conduction period of said gate.

6. Apparatus for producing a digital indication of an applied signal, said apparatus comprising a network having an output and at least two inputs and forming an error signal at said output as the combination of signals applied to the inputs thereof, one of said inputs being connected to receive said applied signal, circuit means forming pulses having a repetition rate variable within a first range during a predetermined time in response to the amplitude of an error signal applied thereto, a gate, control means for enabling said gate, digital counting means having a first section for counting selected more-significant digits according to a preselected radix and a second section for counting less-significant digits according to said radix, the second section being adapted to trigger the first section one count in response to a number of pulses related to a multiple of said radix being applied to said second section, at least the first section producing a digital output related to the count of pulses taken thereby, means including said gate for applying said pulses having a repetition rate within said first range to the first section of said digital counting means, means connected to the digital counting means and to another input of said network for applying thereto a signal having an amplitude related to said digital output, said circuit means forming pulses after said predetermined time having a repetition rate variable within a second range in response to an error signal applied to said circuit means, and means including said gate for applying pulses having a repetition rate within said second range to the second section of said digital counting means, the limits of said first range being related to the limits of said second range by said multiple of the radix.

7. Apparatus for producing a digital indication of an applied signal, said apparatus comprising pulse-forming means forming pulses having a repetition rate which is variable within a first range during a predetermined time in response to the amplitude of an input signal, a gate, control means for enabling said gate, a counter having a first section for counting selected more-significant digits according to a preselected radix and a second section for counting less-significant digits according to said radix, the first section of said counter being triggered one count for each number of pulses related to a multiple of said radix applied to the second section, first means including said gate for applying said pulses having a repetition rate within said first range to the first section of said counter, means connected to the pulse-forming means for altering, after said predetermined time, the relationship between repetition rate and applied signal provided by said pulse-forming means to produce pulses after said predetermined time having a repetition rate which is variable within the second range in response to said input signal, and means connected to said second section of the counter for applying pulses thereto having a repetition rate within said second range, the limits of said first range being related to the limits of said second range by said radix.

8. Apparatus for producing a digital indication of an input signal, said apparatus comprising means forming pulses having a repetition rate related to the amplitude of an error signal, a gate, digital counting means producing a digital output related to the count taken of pulses applied thereto, means including said gate to apply the pulses to said digital counting means for a predetermined period, means connected to receive said digital output for producing a signal having an amplitude related to the count of said pulses taken by the digital counting means during said period, and means connected to receive said signal and the input signal to produce said error signal.

9. Apparatus for producing a digital indication of an input signal, said apparatus comprising means forming pulses having variable repetition rate, a gate, control means for enabling said gate for a predetermined period, digital counting means for producing a digital output related to the count taken of pulses applied thereto, means including said gate to apply said pulses to said digital counting means, a network having an output and a pair of inputs, said network producing an error signal at the output thereof as the difference between signals applied to the inputs thereof, means responsive to said error signal to vary the repetition rate of said pulses, means connected to receive said digital output and to one input of said network for applying thereto a signal having an amplitude related to the count of pulses taken by the digital counting means during said period, and means to apply said input signal to the other input of said network.

References Cited by the Examiner

UNITED STATES PATENTS 3,064,193  11/62  Grubb et al. _____ 340—347

MALCOLM A. MORRISON, *Primary Examiner.*

LLOYD W. MASSEY, *Examiner.*